Jan. 11, 1944. J. M. WEYDELL 2,339,228
DYNAMO-ELECTRIC MACHINE
Filed May 31, 1938 4 Sheets-Sheet 1

INVENTOR.
JARL M. WEYDELL,
BY
ATTORNEYS.

Jan. 11, 1944. J. M. WEYDELL 2,339,228
DYNAMO-ELECTRIC MACHINE
Filed May 31, 1938 4 Sheets-Sheet 3

INVENTOR.
JARL M. WEYDELL,
BY
ATTORNEYS.

Jan. 11, 1944.     J. M. WEYDELL     2,339,228
DYNAMO-ELECTRIC MACHINE
Filed May 31, 1938        4 Sheets-Sheet 4

INVENTOR.
JARL M. WEYDELL,
BY
ATTORNEYS.

Patented Jan. 11, 1944

2,339,228

UNITED STATES PATENT OFFICE 2,339,228

DYNAMOELECTRIC MACHINE

Jarl M. Weydell, Indianapolis, Ind., assignor of one-half to Edward E. Stout, Indianapolis, Ind.

Application May 31, 1938, Serial No. 210,879

15 Claims. (Cl. 171—252)

My invention relates to a dynamo-electric machine primarily suitable for use in connection with an automobile engine and capable of acting as a motor to crank the engine and also as a generator to supply current for the charging of the usual storage battery and for other purposes when the engine is running under its own power. Attempts have heretofore been made to produce a dynamo-electric machine of this type but, so far as I am aware, such prior machines have been so cumbersome and complicated that little if any savings in weight and cost have been secured through their use.

It is the object of my invention to produce an electric generator primarily suitable for all purposes for which the generator customarily associated with an automobile engine is employed, which generator may also function as a motor operative to crank the engine. A further object of my invention is to produce a dynamo-electric machine of the kind stated which, when operating as a generator, will supply both direct and alternating current. Another object of my invention is to produce a machine of the type described which, when functioning as a generator, will operate satisfactorily under the speed variations to which it is subjected. Still another object of my invention is to produce such a machine in which all the windings will be stationary in order to facilitate changing the arrangement of their connections to alter the electrical characteristics of the unit and thereby to adapt it for its different uses as a generator and as a motor.

In carrying out my invention I provide a rotor having pole pieces which are magnetized by a stationary field coil. Associated with the pole pieces I provide stationary armature coils which are cut by the magnetic flux as the rotor rotates. As so far described, the device embodies the same general idea as the generator disclosed in my prior Patent No. 2,119,477, granted May 31, 1938. The present invention, however, differs from the generator of such prior patent in certain structural details and also in the provision of switch means operable to vary the manner in which the armature coils are connected together so as to obtain both the characteristics desirable for satisfactory generator operation and the characteristics desirable for satisfactory motor operation. Another difference between the device of the present application and the generator of my prior patent lies in the provision of speed-responsive means for shifting the angular position of the commutator relative to the rotor pole-pieces to produce, in effect, a variation of the plane of commutation.

The accompanying drawings illustrate my invention.

For the sake of convenience, my machine will be considered a simple generator in the description of its windings, cores, and rotating pole pieces. The field, which comprises a series winding 15 and a shunt winding 16, is supported within a casing 18 of magnetic material, and has mounted for rotation within it a coaxial shaft 19. The casing 18 may be laminated, as by forming it of a strip of iron wound spirally. The shaft 19 carries within the field 15—16 a cylindrical field-core 20 of magnetic material which has magnetically continuous and rigid with it at its respective ends and beyond the field-winding 15—16 diametrically extending pole-pieces 22 and 24. The core 20, with its pole-pieces 22 and 24, is not mounted rigidly upon the shaft 19, but instead has a limited freedom of angular movement relative thereto, for a purpose which will hereinafter be set forth.

The stationary armature is associated with the rotating pole pieces 22 and 24 and, in the embodiment illustrated, is wound for the production of two-phase current. In the plane of each of the pole-pieces 22 and 24 I provide an armature-core 30 which is desirably laminated and which is magnetically continuous with the casing 18.

Each armature core 30 is slotted internally for the reception of eight coils. Four of such coils, indicated at 34, are spaced at 90° intervals and constitute the windings of one phase; while the other four coils, indicated at 35, are arranged angularly intermediate the coils 34. The eight coils 34 (four in association with each armature-core) constitute the windings of one phase, and the eight coils 35 constitute the windings of the other phase. It will be obvious from this description that when the field 15—16 is energized and the core 20 with its pole-pieces 22 and 24 rotated there will be induced in the armature a two-phase current having a frequency equal to twice the rotational speed of the core.

The arrangement of armature windings and pole-pieces at opposite ends of the field winding as above described is preferred but is not essential.

As in my prior patent above referred to, a part of the alternating current generated in the armature windings is rectified and employed to energize the field. If desired, a rectified current may also be supplied to an outside load as, for example, for use in charging a storage battery. To rectify such portion or portions of the alternating current generated in the armature as are necessary for charging the field or for other purposes I employ, as in the device of my prior patent, a commutator rotatable with the shaft 19.

Figure 5:
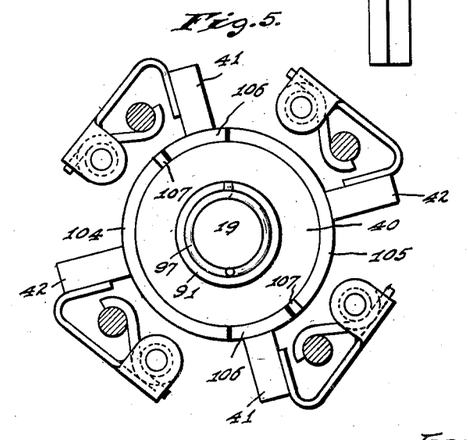
Fig. 5 is an end elevation of the commutator.

The direct current desired may be obtained by rectifying only one phase of the alternating armature current; but desirably a portion of each phase of the armature current is rectified to produce the direct current desired, as better balance is thus maintained and a steadier direct current produced. To this end, there is provided for each phase a two-segment commutator co-operating with which are four equally spaced brushes. As indicated in the drawings, (see Figs. 5 and 8) the commutator 40 for the armature windings 34 has associated with it a pair of diametrically opposite brushes 41, which are adapted for connection to the armature windings 34, and a second pair of diametrically opposite brushes 42 which are adapted for connection to outside leads. The commutator 44 associated with the windings 35 of the other phase has associated with it a pair of diametrically opposite brushes 45 adapted for connection to the windings 35 and a second pair of diametrically opposite brushes 46 adapted for connection to outside leads.

The device as so far described could be made to function satisfactorily either as a motor or as a generator, but for use alternatively as a motor or generator two additional elements are desirable—namely, suitable switch mechanism for varying the manner in which the windings of each phase are interconnected and commutator-control mechanism for shifting the effective plane of commutation.

Figure 6:
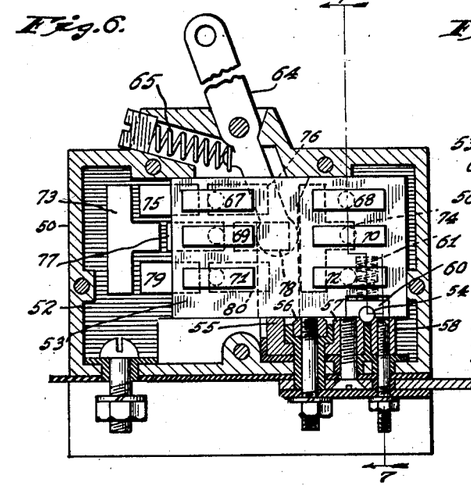
Fig. 6 is a section on the line 6—6 of Fig. 7 illustrating a preferred form of suitable switch mechanism.
Figure 7:
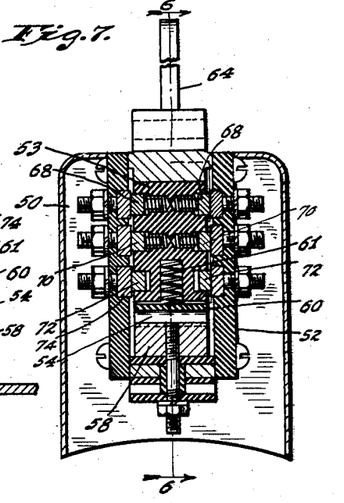
Fig. 7 is a section on the line 7—7 of Fig. 6.

Any form of switch mechanism by which the armature windings of each phase can be changed from series-connected to parallel-connected may be employed, but I prefer to use the switch mechanism illustrated in Figs. 6 and 7 of the drawings. In that mechanism, an enclosing casing 50 houses a pair of spaced parallel plates 51 and 52 of insulating material between which there is a movable member in the form of a sliding block 53, also of insulating material. The opposed faces of the plates 51 and 52 carry sets of fixed contacts which are connected respectively to the two sets of armature windings 34 and 35, while the movable member 53 carries on its opposite faces contacts by means of which the stationary contacts on the plates 51 and 52 may be connected in various ways to be hereinafter described in detail.

The movable member 53 also carries, conveniently in its lower face, a contact 54 by means of which any two adjacent contacts of a series of four stationary contacts 55, 56, 57, and 58 may be interconnected. Conveniently, the contact 54 is in the form of a roller, and the adjacent edges of the contacts 55, 56, 57, and 58 are beveled so as to provide seats for such roller. As shown, the roller 54 is mounted in a member 60 which is spring-pressed toward the contacts 55, 56, 57, and 58 as by a spring 61. With this arrangement, the beveled edges of the four stationary contacts 55, 56, 57, and 58 serve, in co-operation with the roller 54, to define three controlling positions of the movable member 53. The contacts 54, 55, 56, 57, and 58 constitute a field switch by which the series field 15 and shunt field 16 are selectively rendered operative.

For the purpose of moving the movable member 53, there may be associated with it a pivoted lever 64 one end of which is received in a slot in the member 53. Desirably, the member 53 is biased, as by means of a spring 65 acting on the lever 64, toward one end of its permissible range of movement, shown in Fig. 6 as the right-hand end where the roller 54 is seated between and serves to interconnect the contacts 57 and 58.

Figure 8:
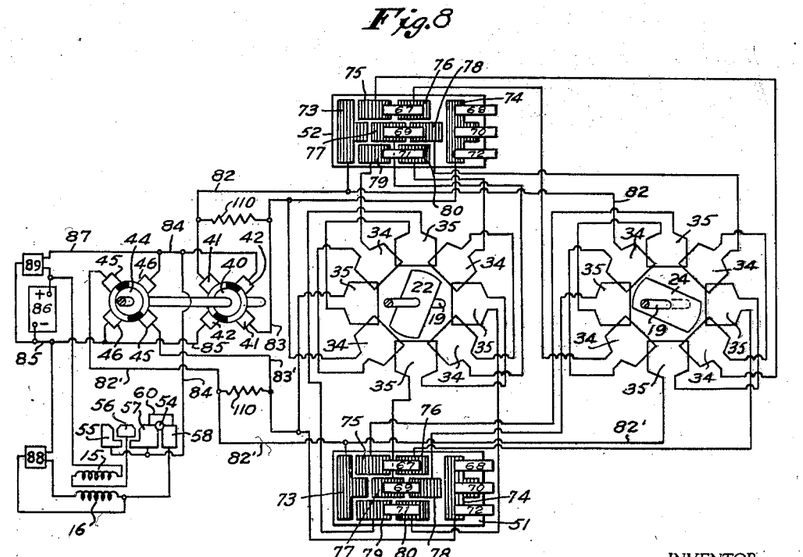
Figs. 8, 9, and 10 are diagrammatic views illustrating the electrical connections in three different positions of the switch, the position shown in Fig. 8 being that employed when the device is being used as a generator, the position shown in Fig. 9 being that employed at the start of a cranking operation with the device functioning as a motor, and the position shown in Fig. 10 being that employed when the device is running as a motor under normal operating conditions.

The set of contacts controlling the interconnection of the windings 34 comprises a group of stationary contacts, indicated in Figs. 6 and 8 as mounted on the inner face of the plate 52, and a group of movable contacts mounted on the adjacent face of the sliding member 53. The latter group of contacts consists of six contacts numbered 67 to 72 inclusive and arranged as shown in Figs. 6 and 8—namely, in pairs with the two contacts of each pair spaced from each other in the direction of movement of the movable member 53 and with the three pairs spaced transversely of such direction of movement.

The group of stationary contacts with which the movable group of contacts 67 and 72 co-operate are eight in number. Two of these, indicated at 73 and 74, are spaced longitudinally from each other and are wide enough to bridge the paths of movement of the three pairs of movable contacts; two other contacts, shown at 75 and 76, are disposed between the contacts 73 and 74 in the path of movement of the contacts 67 and 68; two more, shown at 77 and 78, are disposed between the contacts 73 and 74 in the path of movement of the movable contacts 69 and 70; while the last two stationary contacts, 79 and 80, are disposed between the contacts 73 and 74 in the path of movement of the movable contacts 71 and 72.

A similar group of fixed contacts 73 to 80 are mounted on the inner face of the plate 51 to co-operate with a second group of movable contacts 67 to 72 mounted on the movable member 53. These two groups of contacts control the manner in which the armature windings 35 are interconnected.

Figure 9:
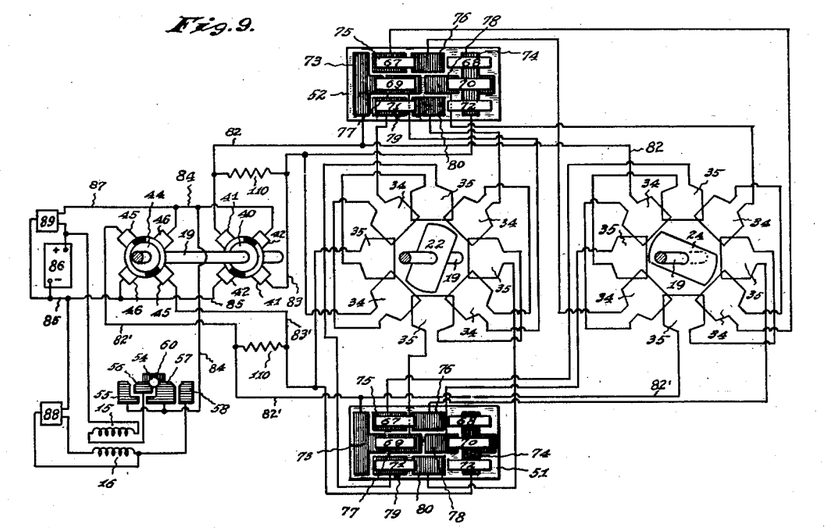
Figure 10:
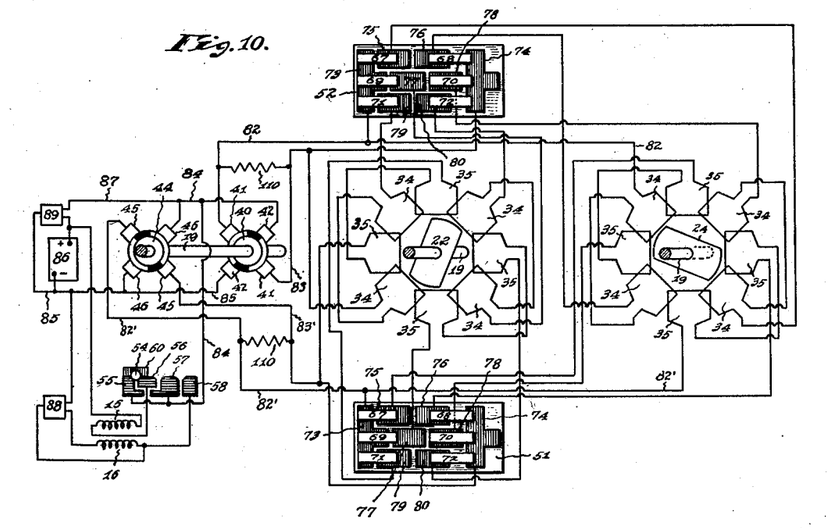

The preferred manner in which the various elements of the machine and of the switch mechanism are connected together is illustrated in Figs. 8, 9, and 10. As there shown, the eight windings 34, four at one end of the machine in association with the pole piece 22 and the other four at the opposite end of the machine in association with the pole piece 24, are arranged in four pairs, with the two windings of each pair connected together in series. The interconnection of the armature windings 34 in pairs should obviously be effected in such a manner that, when the machine operates as a generator, the E. M. F.'s respectively induced in the windings of each pair will be additive. In the drawings, I have shown two adjacent windings 34 permanently connected together to form each pair; but the relative positions of the two windings forming each pair is immaterial, it being necessary only that the manner of interconnection be such that the E. M. F.'s respectively generated in the two windings of each pair will tend to cause current flow in the same direction, as indicated above.

The various pairs of windings 34 are connected to the stationary contacts 75 to 80 on the switch-plate 52 illustrated at the top of each of Figs. 8, 9, and 10. The two contacts 73 and 74 on this switch-plate are connected respectively by conductors 82 and 83 to the two brushes 41 associated with the commutator 40. One pair of windings 34, shown as the left hand pair of windings 34 associated with the pole piece 24, are connected between the conductor 82 and the stationary contact 76. A second pair of windings 34, shown as the right hand pair associated with the pole piece 24, are connected between the stationary switch contact 75 and the contact 78. A third pair of windings 34, shown as the right hand pair in association with the pole piece 22, are connected between the switch contacts 77 and 80. The remaining pair of windings 34 are connected between the switch-contact 79 and the conductor 83.

The four pairs of windings 35, constituting the other phase of the armature winding, are connected in similar manner between conductors 82' and 83' and the contacts 75 to 80 on the switch plate 51, the conductors 82' and 83' being connected respectively to the switch contacts 73 and 74 on the plate 51 and to the two brushes 45 associated with the commutator 44. In connecting the four pairs of windings of each phase with the stationary switch contacts, they should of course be connected in such a manner that all the E. M. F.'s respectively induced in the several pairs will promote current flow in the same direction between the conductors 82 and 83 or 82' and 83' when the device is operating as a generator with all the armature windings connected in series as hereinafter described.

As shown in Figs. 8, 9, and 10, where an automobile installation is diagrammatically illustrated, one of the brushes 42 and one of the brushes 46 are connected with a conductor 84 which is in turn connected to the two contacts 55 and 57 of the field-switch, while the other brush 42 and the other brush 46 are connected to a conductor 85. A storage battery 86 has one terminal connected to the conductor 85 and its other terminal to a conductor 87 which is in turn connected to the conductor 84. The series field 15 is connected between the conductor 87 and the contact 56 of the field switch, while the shunt field 16 is connected between the contact 58 of the field switch and the conductor 85, preferably through a suitable voltage regulator 88. Between its connection to the series field 15 and its connection to the conductor 84, the conductor 87 preferably includes a cut-out 89 which, to prevent drain on the battery 86, is open except when the machine is operating as a generator to create across the conductors 84 and 85 a voltage at or above a predetermined minimum.

In the normal position of the movable switch member 53, which is illustrated in Figs. 6 and 8 and which is employed when the device is operating as a generator, each movable contact 67 engages and interconnects the associated stationary contacts 75 and 76, each movable contact 69 engages and interconnects the associated stationary contacts 77 and 78, while each movable contact 71 engages and interconnects the two stationary contacts 79 and 80. The movable contacts 68, 70, and 72 of each group are, in this position of the movable member 53, inoperative. By reason of the connections effected by the movable contacts 67, 69, and 71 as just described, the pairs of armature windings 34 are all connected in series between the conductors 82 and 83, while the pairs of armature windings 35 are all connected in series between the conductors 82' and 83'. Thus, by way of example, the armature-winding circuit between the conductors 82 and 83 includes, in order, the left-hand pair of windings 34 associated with the pole piece 24, the contacts 76, 67, and 75 of the upper (Fig. 8) switch, the right-hand pair of windings 34 associated with the pole piece 24, the contacts 78, 69, and 77 of the upper switch, the right-hand pair of windings 34 associated with the pole piece 22, the switch contacts 80, 71, and 79 of the upper switch, and the fourth pair of windings 34.

In this normal, or generating, position of the movable switch member 53, the contact 54 of the field switch is disposed between and interconnects the fixed contacts 57 and 58, so that the shunt field winding 16 is connected between the wires 84 and 85, while the series field 15 is inoperative.

If, with the movable switch member 53 in its normal position to effect the armature and field connections just described, the shaft 19 is rotated, an alternating current having a frequency equal to twice the rotational speed of the shaft 19 will be generated in the set of armature windings 34, as set forth in my prior Patent No. 2,119,477, and will be rectified by the commutator 40. A second alternating current will be generated in similar manner in the set of armature windings 35 and will be rectified by the commutator 44. The two rectified currents will be combined in the conductors 84 and 85 and will be supplied to the shunt field 16 through the field-switch contacts 57, 54, and 58. Because the frequency of the two alternating currents respectively generated in the two sets of armature windings 34 is twice the rotational speed of the shaft 19, and because the windings 34 are displaced 45° from the windings 35, the two alternating currents will be displaced from each other by 90 electrical degrees. Hence, the two commutators 40 and 44 will be displaced from each other by 45 mechanical (90 electrical) degrees. When the voltage across the conductors 84 and 85 attains the predetermined minimum necessary to close the cut-out 89, a portion of the combined rectified currents will be supplied to the storage battery 86 to charge it. When the shaft 19 is not rotating, or when it is rotating below the speed necessary to generate the predetermined minimum voltage, the cut-out 89 is open and the battery 86 is free from connection with the machine.

When the device is to be used as a motor, the switch member 53 is moved to its intermediate (or starting) position to place the two groups of movable contacts carried by it in the positions respectively illustrated at the top and bottom of Fig. 9 and to move the contact 54 of the field switch into such position that it interconnects the stationary contacts 56 and 57, also as illustrated in Fig. 9. In this intermediate position of the movable switch member 53, the shunt field 16 is inoperative and the series field 15 is connected in series with the storage battery 86 between the conductors 84 and 85, its connection to the conductor 84 including the contacts 56, 54 and 57 of the field switch.

As will be apparent from Fig. 9, when the movable member 53 of the switch mechanism is in its intermediate position, each of the movable contacts 69 interconnects the associated stationary contacts 73 and 77, each movable contact 70 interconnects the associated stationary contacts 78 and 74, each movable contact 67 interconnects the associated stationary contacts 75 and 76, each movable contact 71 interconnects the associated stationary contacts 79 and 80, and the movable contacts 68 and 72 remain inoperative. By reason of the interconnections thus provided among the several pairs of armature windings, the pairs of windings 34 are now connected in series-parallel between the wires 82 and 83, while the pairs of windings 35 are connected in series-parallel in corresponding manner between the wires 82' and 83'. Thus, by way of example, the pairs of windings 34 now provide two independent paths between the conductors 82 and 83. One of these paths extends from the conductor 82 through the left hand pair of windings 34 associated with the pole piece 24, the switch contacts 76, 67, and 75 of the upper (Fig. 9) switch mechanism, the right-hand pair of windings 34 associated with the pole piece 24, and the switch contacts 78, 70, and 74 to the conductor 83. The other, and parallel, path extends from the conductor 82 through the switch contacts 73, 69, and 77, the right-hand pair of windings 34 associated with the pole piece 22, the switch contacts 80, 71, and 79, and the left-hand pair of windings 34 associated with the pole piece 22 to the wire 83. In similar manner, the windings 35, interconnected by the lower group of contacts illustrated in Fig. 9, provide two independent paths between the wires 82' and 83'.

With these conditions obtaining, current from the storage battery 86 is supplied through the conductor 85 and through the series field 15, field-switch contacts 56, 54 and 57, and wire 84 to the two pairs of brushes 42 and 46, and the machine operates as a motor, just as any D. C. generator comprising relatively rotatable field poles and armature windings will operate as a motor when supplied with a direct current.

After the machine has begun to rotate as a motor, the movable member 53 of the switch mechanism is moved to its extreme position as illustrated in Fig. 10. In this position, the movable field-switch contact 54 interconnects the stationary contacts 55 and 56, so that the series field 15 remains connected in series with the battery between the conductors 84 and 85. The movable armature switch contacts are now so disposed that the stationary contacts 75, 77, and 79 are all connected to the stationary contact 73 by the movable contacts 67, 69, and 71 respectively, while the stationary contacts 76, 78, and 80 are all connected to the stationary contact 74 by the movable contacts 68, 70, and 72 respectively. As will be readily apparent, this arrangement of the movable switch contacts 67 to 72 inclusive interconnects each pair of windings 34, independently of any other pair, to the wires 82 and 83, with the result that the four pairs of windings 34 are now connected in parallel between those two conductors. In similar manner, the four pairs of windings 35 are connected in parallel between the conductors 82' and 83'. Current from the battery 86, supplied to the two pairs of brushes 42 and 46 through the series field 15, causes the machine to continue to operate as a motor.

It will be noted that adjustment of the movable switch member 53 and consequent rearrangement of the armature-switch contacts does not alter the sense in which any pair of armature windings is connected between the conductors 82 and 83 or 82' and 83'. Thus, for example, the lower terminal of the right hand pair of windings 34 associated with the pole piece 22 is always connected to the conductor 82 and the upper terminal of such pair of windings is always connected to the conductor 83, irrespective of whether the armature switch is in the condition shown in Fig. 8, the condition shown in Fig. 9, or the condition shown in Fig. 10. In Fig. 8, the lower terminal of the winding-pair referred to is connected to the conductor 82 through the contacts 77—69—78 of the upper armature switch, the right-hand pair of windings 34 associated with the pole piece 24, the switch contacts 75—67—76, and the left-hand windings 34 associated with the pole piece 24; while the upper terminal is connected to the conductor 83 through the switch contacts 80—71—79 and the extreme left-hand pair of windings 34. In Figs. 9 and 10 the connection of the lower terminal of the right-hand pair of windings 34 associated with the pole piece 22 to the conductor 82 is by way of the upper switch contacts 77, 69, and 73; while the upper terminal is connected to the conductor 83 through switch contacts 80, 71, and 79 and the extreme left hand pair of windings 34 in Fig. 9, and through the switch contacts 80, 72, and 74 in Fig. 10. As a result of the fact that the sense in which each pair of armature windings is connected in the armature circuit is not reversed by adjustment of the armature switch, changing the position of the movable switch member 53 cannot alter the circumferential sequence of polarities of the armature poles at either end of the machine.

Desirably, the contacts of the switching mechanism are so arranged that the field-switch contacts open earlier and close later than the armature contacts. Thus, sparking and its harmful effects are concentrated at the field-switch.

In the conventional simple motor, it is customary to dispose the brushes somewhat rearwardly from their neutral position in order that commutation may occur at a slight interval before the armature and field poles are centered. In a generator, on the other hand, it is customary to advance the brushes from neutral position in order to delay commutation until after the armature poles have moved past a position of alinement with the field poles. Since my device is intended to function alternatively as a motor or as a generator, it is desirable that some means be employed to vary the angular locations of the points at which commutation occurs in the rotation of the pole pieces 22 and 24. In the drawings, I have shown an arrangement in which the points at which commutation occurs are shifted, not by movement of the brushes, but by angular displacement of the commutators 40 and 44 relative to the pole pieces 22 and 24.

To this end the commutators 40 and 44 are carried on a sleeve 91 which is rotatably mounted on the shaft 19. As previously mentioned, the core 20 is not rigidly connected to the shaft 19, but instead has a certain freedom of movement relative thereto. Conveniently, this freedom of movement is provided through the medium of a key 92 which is mounted in the shaft 19 (see Figs. 2, 3, and 4) and which is received in a key-way 93 of somewhat greater width in the core 20. The device illustrated is intended to rotate in a counterclockwise direction (Figs. 2 and 3); and it will therefore be apparent that when it is operating as a generator with the shaft 19 driving the core 20 those parts will occupy the respective positions illustrated in Fig. 3 with the key 92 at the counterclockwise end of the key-way 93, and that when the device is operating as a motor with the core 20 driving the shaft 19, the key 92 will be disposed at the clockwise end of the key-way as in Fig. 2.

Figure 1:
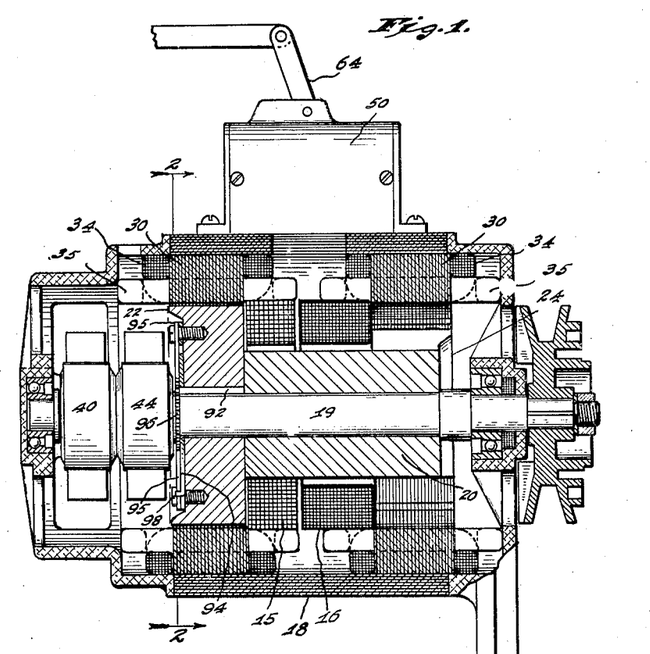
Fig. 1 is an axial section through a dynamo-electric machine embodying my invention.
Figures 2, 3, 4:
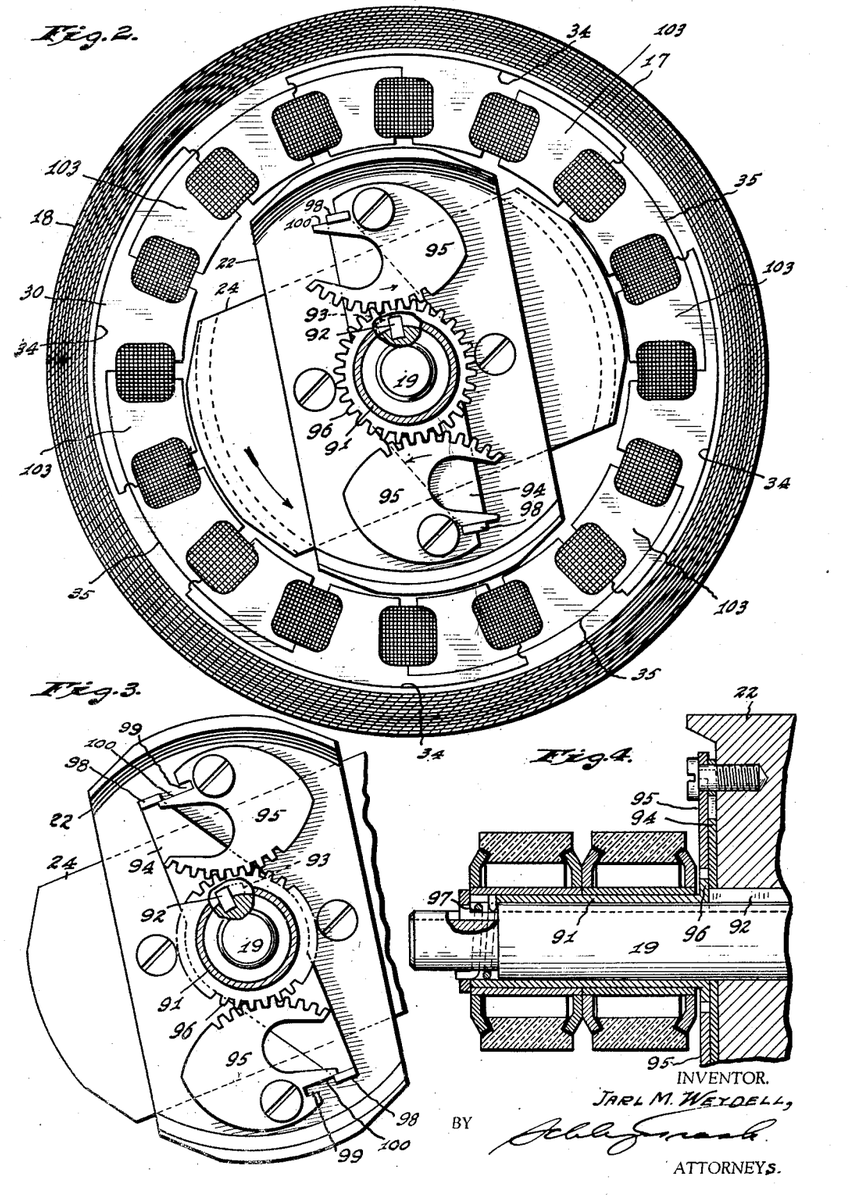
Fig. 2 is a transverse section on the line 2—2 of Fig. 1 showing the commutator-controlling mechanism in the condition existing when the device is functioning as a motor.
Fig. 3 is a fragmental view similar to Fig. 2 but showing the condition existing when the device is functioning as a generator.
Fig. 4 is a view similar to Fig. 1, but on an enlarged scale.

Advantage is taken of the relative movement between the core 20 and shaft 19 to control the angular position of the commutators. For this purpose, there is rigidly mounted on the shaft 19 adjacent the pole-piece 22 a plate 94 which may be keyed to the shaft 19 by the key 92. Pivotally mounted at diametrically opposite points on the face of the pole-piece 22 are two gear-segments 95 which mesh with a gear 96 rigid with the commutator-sleeve 91. A torsion spring 97, acting between the shaft 19 and sleeve 91, tends to rotate the latter in a counter-clockwise direction (Figs. 2 and 3) about its axis. Rotation of the sleeve 91 and gear segments 95 under the influence of the spring 97 is limited as by engagement of a finger 98, struck up from the plate 94, with the bottom of a laterally presented notch 99 in each gear-segment as shown in Fig. 2. The inner wall 100 of each notch 99 projects outwardly beyond the outer wall to form a cam-surface co-operating with the associated finger 98 to swing the segment 95 in a counter-clockwise direction about its axis when the plate 94 moves in a counter-clockwise direction from the position shown in Fig. 2 to the position shown in Fig. 3.

The parts are illustrated in Fig. 2 in the positions they occupy when the device is functioning as a motor. In this condition, the core 20 will be at the counter-clockwise limit of its rotation relative to the shaft 19, and the fingers 98 on the plate 94 will be seated in the notches 99 of the respective gear-segments 95. When the device ceases to operate as a motor and begins to operate as a generator, the shaft 19, carrying the plate 94 with it, rotates in a counter-clockwise direction relatively to the core 20, or to the position indicated in Fig. 3. In the resultant rotation of the plate 94 relative to the pole-piece 22, the fingers 98 engage the respectively associated cam-surfaces 100 and swing the gear segments 95 in a counter-clockwise direction around their respective axes, thus causing the gear 96 and commutator sleeve 91 to rotate in a clockwise direction, or backwardly, relative to the core 20 and the pole-pieces. This produces the same effect as if the commutator remained in fixed position relative to the pole-pieces and the brushes associated with it had been moved forwardly in the direction of core-rotation—i. e. commutation is made to occur later.

In a generator, the desired degree of deferment of commutation increases with speed; and such an increase may be provided in my device. To accomplish this result each of the gear-segments 95 is so proportioned that its center of gravity is on the clockwise (relative to the core-axis) side of the gear-segment axis when the device is functioning as a generator. As a result of this, centrifugal force acting on the gear-segments and yieldingly opposed by the spring 97 tends to rotate them further in a counter-clockwise direction about their respective axes and to cause further rearward movement of the commutators relative to the pole-pieces. Such further movement of the commutators may be limited as by engagement of the segments 25 with flanges 101 on the pole-pieces.

When the device is operating as a motor, with the parts in the position shown in Fig. 2, centrifugal force acting on the unbalanced gear-segments 95 is prevented from displacing them as the result of the engagement between the fingers 98 and the outer walls of the notches 99. When the device is operating as a generator, however, the shifting of the plate 94 to the position shown in Fig. 3 carries the fingers 98 beyond the outer walls of the notches 99, with the result that the gear segments 95 become free to move under the influence of centrifugal force and to retard commutation further in proportion to speed.

It will be noted from Fig. 2 that adjacent armature-windings 34 and 35 overlap angularly and that certain spaced portions 103 of the armature core are therefore each embraced by armature windings of different phases. When the device is operating as a motor, each of those core-portions 103 would be substantially neutral magnetically if the respective currents in the two windings which embrace it were flowing in opposite directions. If the segments 104 and 105 of the commutators 40 and 44 were each effectively 180° in extent one or the other of the two sets of alternate core-portions 103 would be substantially neutral magnetically during each 45° of rotation of the core 20. I have found that under such conditions the torque produced by my device when operating as a motor is relatively uneven and, on the average, less than it would be in the absence of magnetically neutral core-portions. I therefore prefer to make the commutator segments 104 and 105 considerably less than 180° in effective extent, filling the gaps between them with idle segments 106.

If desired, the commutator segments could be shortened circumferentially to an extent such that the two sets of armature windings would never be simultaneously energized, but such shortening of the commutator segments is unnecessary. In fact, such extreme shortening of the commutator segments is not altogether desirable; for the shorter the commutator segments, the less will be that portion of the alternating-current wave which is rectified when the device is operating as a generator. It is therefore regarded as sufficient if the commutator segments 104 and 105 are shortened circumferentially to a point such that reasonably uniform torque is produced when the device is operating as a motor.

I also find it an advantage in promoting uniformity of torque to so arrange the pole-pieces 22 and 24 that they are not simultaneously in alinement with armature-poles. With the particular number and arrangement of armature windings shown, I find that best results in the way of uniform torque are secured if the pole-pieces 22 and 24 are offset 11¼ degrees from a position of quadrature.

When the device is functioning as a generator, the off-setting of the pole-pieces as just described causes the currnt generated in each set of armature windings at one end of the machine to be out of phase with the current generated in the corresponding set of armature windings at the other end of the machine. This phase-difference decreases the total current-output; but, from a practical standpoint, such decrease is negligible.

When the device is operating as a motor, especially at low speeds and at heavy load, rather severe sparking occurs at the brushes. Copper has well-known advantages for use as commutator segments; but I find that in my device the sparking which occurs between the brushes and the trailing edgs of the commutator segments is so severe that relatively rapid disintegration of the trailing edge of the copper segment will occur. I therefore make the body of each commutator segment of copper and the trailing edge, indicated at 107 in Fig. 5, of some material better able to withstand the deleterious effects of sparking and preferably of a material which also possesses a relatively high contact resistance with the brushes. I have found nichrome to be a suitable material for the segment-portions 107. Because there is a relatively high resistance at the engaging surfaces of the nichrome segment-portions and brushes, the current flowing between brush and segment at the instant of interruption is materially less than it would be if the entire segment were made of copper; and further, such sparking as does occur has less effect upon the nichrome than it does upon copper.

There may be some tendency to spark at the brushes when the device is functioning as a generator, and I find that such a tendency can be greatly decreased if a slight load is applied across each pair of brushes 41—41 and 45—45. To ensure the existence of such loads, I may connect resistances 110 between the conductors 82 and 83 and between the conductors 82' and 83'. The resistances 110 operate not only to decrease sparking at the brushes but also to prevent the creation between the conductors 82 and 83 (or 82' and 83') of an alternating-current voltage which is considerably in excess of the direct-current voltage. I find that the resistances 110 may be relatively large and still perform this latter function; for only a slight load on the alternating-current circuits is necessary to prevent the generation of excessive alternating-current voltage.

When the device described is used on an automobile and functions alternatively as a motor to crank the automobile engine or as a generator, driven by the engine, to supply current for charging the storage battery and for other purposes, I prefer to connect the shaft 19 with the engine through a power transmission mechanism of the general type set forth in my prior Patent No. 2,153,856, granted April 11, 1939. Such a transmission mechanism automatically provides different speed-ratios depending upon whether the motor-generator is driving or is being driven by the engine and enables the speed of the shaft 19 to be materially higher relative to the speed of the engine when the latter is driven by the former than when the engine is operating under its own power to drive the motor-generator.

In operation, the normal position of the movable switch member 53 is that illustrated in Fig. 6, in which condition the armature windings of each phase are connected in series. If the device is associated with an automobile-engine and if that engine is at rest, there will be no voltage across the conductors 84 and 85 and the cut-out 89 will be open. If the lever 64 is now swung to move the switch member 53 to its intermediate (starting) position the resultant engagement of the contact 54 with the contacts 56 and 57 will complete a circuit including the series field 15 and the battery 86. The device now functions as a motor serving to crank the engine. After the engine begins to rotate, the switch member 53 may be moved to its leftward limit of movement, or into running position, to effect a parallel connection of the pairs of armature windings in each phase.

When the engine starts to run under its own power, the lever 64 is released, and the spring 65 returns the switch member to its normal position. Thereupon, the armature windings of each phase become connected in series, and the device begins to function as a shunt-wound generator under the control of the voltage regulator 88.

It is not essential that the switch mechanism controlling interconnection of the armature windings provide, when the device is functioning as a motor, both the starting and the running conditions above described. I prefer, however, to employ different armature-connections during starting and running, as I thereby eliminate excessive drain on the battery as the motor starts while still providing full power for cranking the engine.

In the device as described, all the alternating current produced in each phase when the device is functioning as a generator is rectified, with the exception of the practically negligible portions flowing through the resistances 110. If desired, however, an alternating-current load, such as lamps, may be connected across the conductors 82 and 83 or 82' and 83'.

I claim as my invention:

1. In a dynamo-electric machine, a pair of rotatable pole-pieces of magnetic material, a stationary field for magnetizing said pole-pieces, stationary armature windings inductively associated with said pole-pieces, and switch mechanism for interconnecting said windings in different manners with windings which are in series in one manner of interconnection in parallel in another manner of interconnection.

2. In a dynamo-electric machine, a pair of rotatable pole-pieces of magnetic material, a field for magnetizing said pole-pieces, stationary armature windings inductively associated with said pole-pieces, and switch mechanism for interconnecting said windings in different manners with windings which are in series in one manner of interconnection in parallel in another manner of interconnection.

3. In a dynamo-electric machine, a pair of rotatable pole-pieces of magnetic material, a field for magnetizing said pole-pieces, stationary armature windings inductively associated with said pole-pieces, commutating means for rectifying and supplying to said field at least a portion of the current generated in said armature windings, and switch mechanism for interconnecting said windings in different manners with windings which are in series in one manner of interconnection in parallel in another manner of interconnection.

4. In a dynamo-electric machine, a pair of rotatable pole-pieces of magnetic material, a field for magnetizing said pole-pieces, stationary armature windings inductively associated with said pole-pieces, commutating means for rectifying and supplying to said field at least a portion of the current generated in said armature windings, said field comprising series and shunt windings, and switch mechanism for selectively connecting said series field winding or said shunt field winding to said commutating means.

5. In a dynamo-electric machine, a pair of rotatable pole-pieces of magnetic material, a field for magnetizing said pole-pieces, stationary armature windings inductively associated with said pole-pieces, commutating means for rectifying and supplying to said field at least a portion of the current generated in said armature windings, said field comprising series and shunt windings, and switch mechanism for simultaneously varying the manner in which said armature windings are interconnected and selectively connecting said series field winding or said shunt field winding to said commutating means.

6. In a dynamo-electric machine, a pair of rotatable pole-pieces of magnetic material, a field for magnetizing said pole-pieces, stationary armature windings inductively associated with said pole-pieces, commutating means for rectifying and supplying to said field at least a portion of the current generated in said armature windings, said commutating means including a commutator rotatable with said pole-pieces, and means for varying the position of said commutator angularly relative to said pole-pieces.

7. In a dynamo-electric machine, a stator, a shaft, a rotor carried by said shaft and inductively associated with said stator, said rotor having a limited freedom of angular movement on said shaft, a commutator carried by said shaft, and means operated by angular movement of said rotor relative to said shaft for controlling the angular position of said commutator on said shaft.

8. In a dynamo-electric machine, a rotatable shaft, a rotor mounted on said shaft, a commutator, and mechanism operative to advance the commutation effected by said commutator when said rotor tends to rotate in one direction relatively to said shaft and to retard such commutation when said rotor tends to rotate in the other direcion relatively to said shaft.

9. In a dynamo-electric machine, a stator, a shaft, a rotor carried by said shaft and inductively associated with said stator, said rotor having a limited freedom of angular movement on said shaft, a commutator carried by said shaft, and means operated by angular movement of said rotor relative to said shaft for moving said commutator in the same direction as said rotor but through a greater angle.

10. In a dynamo-electric machine, a shaft, a commutator rotatable with said shaft, means responsive to the speed of said shaft for moving said commutator angularly in a direction opposite to that of shaft rotation, and mechanism acting when said dynamo-electric machine is functioning as a motor for rendering said means inoperative.

11. In combination, a stationary field winding, a rotatable core of magnetic material therein and coaxial therewith, pole pieces of magnetic material disposed on said core at opposite ends thereof and rotatable therewith, a stationary annular armature core enclosing said field winding and projecting axially beyond the ends thereof, a poly-phase armature winding supported within said armature core in the plane of each of said pole-pieces, and commutation means including a commutator for each phase of said armature winding rotatable with said core.

12. The invention set forth in claim 11 with the addition that the angular distance between adjacent coils of the same phase of said armature winding is different from the angular distance between rotatable pole-pieces of opposite magnetic polarity.

13. The invention set forth in claim 11 with the addition that the several coils of each armature winding are equally spaced angularly, said rotatable pole-pieces being unequally spaced angularly.

14. The invention set forth in claim 11 with the addition that in each armature winding adjacent coils of different phase overlap angularly.

15. In a device of the type described, a rotor comprising a plurality of pole-pieces of opposite magnetic polarity, a stationary field coil for magnetizing said pole-pieces, a stationary poly-phase armature inductively associated with said pole-pieces, each phase of said armature including a plurality of coils, and switch mechanism for interconnecting the coils of each phase in different manners with coils which are in series in one manner of interconnection in parallel in another manner of interconnection.

JARL M. WEYDELL.